(12) United States Patent
Manapragada

(10) Patent No.: US 10,034,179 B2
(45) Date of Patent: Jul. 24, 2018

(54) SYSTEM AND METHOD FOR EXTENDING RANGE AND COVERAGE OF BANDWIDTH INTENSIVE WIRELESS DATA STREAMS

(71) Applicant: Sai C. Manapragada, Hayward, CA (US)

(72) Inventor: Sai C. Manapragada, Hayward, CA (US)

( * ) Notice: Subject to any disclaimer, the term of this patent is extended or adjusted under 35 U.S.C. 154(b) by 149 days.

(21) Appl. No.: 14/526,799

(22) Filed: Oct. 29, 2014

(65) Prior Publication Data

US 2015/0117301 A1 Apr. 30, 2015

Related U.S. Application Data

(60) Provisional application No. 61/897,219, filed on Oct. 30, 2013, provisional application No. 61/897,216, filed on Oct. 30, 2013.

(51) Int. Cl.
*H04W 16/26* (2009.01)

(52) U.S. Cl.
CPC .................. *H04W 16/26* (2013.01)

(58) Field of Classification Search
CPC ..... H04W 16/26; H04W 88/04; H04W 88/08; H04W 40/00; H04W 40/22; H04W 16/24; H04W 48/20; H04W 84/00; H04W 84/04; H04W 84/042; H04W 84/045; H04W 84/047
See application file for complete search history.

(56) References Cited

U.S. PATENT DOCUMENTS

| | | | | |
|---|---|---|---|---|
| 2007/0242695 | A1* | 10/2007 | Xu | H04W 48/08 370/468 |
| 2008/0002631 | A1* | 1/2008 | Ramachandran | H04B 7/2606 370/338 |
| 2008/0084855 | A1* | 4/2008 | Rahman | H04L 67/34 370/342 |
| 2010/0128630 | A1* | 5/2010 | Barak | H04W 16/10 370/254 |
| 2011/0110289 | A1* | 5/2011 | Venkatachalam | H04B 7/15528 370/315 |
| 2013/0281049 | A1* | 10/2013 | Lee | H04W 24/00 455/405 |
| 2014/0056209 | A1* | 2/2014 | Park | H04W 16/26 370/315 |
| 2014/0075189 | A1* | 3/2014 | Abraham | H04W 76/04 713/168 |

(Continued)

*Primary Examiner* — Jamal Javaid
*Assistant Examiner* — Rose Clark
(74) *Attorney, Agent, or Firm* — Lance Kreisman; Peninsula Patent Group

(57) ABSTRACT

A wireless networking system is disclosed. The system includes a first wireless access point having a first coverage area. The first wireless access point includes a first wireless transceiver to access a wireless network and a second wireless transceiver coupled to the first wireless transceiver. A second wireless access point has a second coverage area. The second wireless access point includes a third wireless transceiver for establishing a wireless link with the second wireless transceiver, and a fourth wireless transceiver coupled to the third wireless transceiver to provide user access to the wireless link. User access to the wireless link accesses the wireless network via the second and first wireless transceivers.

17 Claims, 5 Drawing Sheets

(56) References Cited

U.S. PATENT DOCUMENTS

| | | | |
|---|---|---|---|
| 2014/0269610 A1* | 9/2014 | Hiben | H04W 36/14 370/331 |
| 2015/0023245 A1* | 1/2015 | Du | H04W 28/0205 370/315 |
| 2015/0098359 A1* | 4/2015 | Yen | H04W 48/16 370/254 |

* cited by examiner

… (1)

SYSTEM AND METHOD FOR EXTENDING RANGE AND COVERAGE OF BANDWIDTH INTENSIVE WIRELESS DATA STREAMS

CROSS-REFERENCE TO RELATED APPLICATIONS

This patent application claims the benefit of U.S. Provisional Patent Application Ser. No. 61/897,219, filed Oct. 30, 2013, and U.S. Provisional Patent Application Ser. No. 61/897,216, filed Oct. 30, 2013, both of which are incorporated by reference herein in their entirety.

TECHNICAL FIELD

The disclosure herein relates to wireless networks, and more specifically to high-bandwidth wireless networks for distributing multi-media content.

BACKGROUND

Wireless networks may take many forms, depending on the application. Various WiFi standards exist where users within range of a "hotspot" may establish a wireless link to access a given network. A given hotspot, or wireless access point, typically has a limited range and coverage area.

With the proliferation of multi-media content over wireless networks comes an insatiable demand for more bandwidth over the networks. Conventional wireless networking architectures fail to provide adequate resources to efficiently provide optimum range and coverage for wireless network users.

BRIEF DESCRIPTION OF THE DRAWINGS

Embodiments of the disclosure are illustrated by way of example, and not by way of limitation, in the figures of the accompanying drawings and in which like reference numerals refer to similar elements and in which.

DETAILED DESCRIPTION

Embodiments of wireless networking systems, wireless transceivers and associated methods are disclosed herein. In one embodiment, a wireless networking system is disclosed. The system includes a first wireless access point having a first coverage area. The first wireless access point includes a first wireless transceiver to access a wireless network and a second wireless transceiver coupled to the first wireless transceiver. A second wireless access point has a second coverage area. The second wireless access point includes a third wireless transceiver for establishing a wireless link with the second wireless transceiver, and a fourth wireless transceiver coupled to the third wireless transceiver to provide user access to the wireless link. User access to the wireless link accesses the wireless network via the second and first wireless transceivers.

In a further embodiment, a method of providing wireless network access to a user is disclosed. The method includes accessing a wireless network with a first wireless transceiver associated with a first wireless access point. The first wireless access point has a first coverage area bounded by a range of a first broadcast transceiver associated with the first wireless access point. Wireless access to the wireless network is enabled within the first coverage area with the first broadcast transceiver. A wireless link is established between the first wireless access point and a third wireless transceiver associated with a second wireless access point. The second wireless access point has a second coverage area bounded by a fourth wireless transceiver. The fourth wireless transceiver is in communication with the third wireless transceiver. Access to the wireless network from within the second coverage area is enabled via the fourth wireless transceiver.

In yet another embodiment, a wireless access point for use in a wireless networking system, the wireless access point includes a first wireless transceiver to establish a wireless link to a wireless network. A second wireless transceiver provides wireless access to the wireless link within a first coverage area. A third wireless transceiver establishes a wireless link to a second wireless access point. Processing logic controls each of the first, second and third wireless transceivers.

Figure 1:
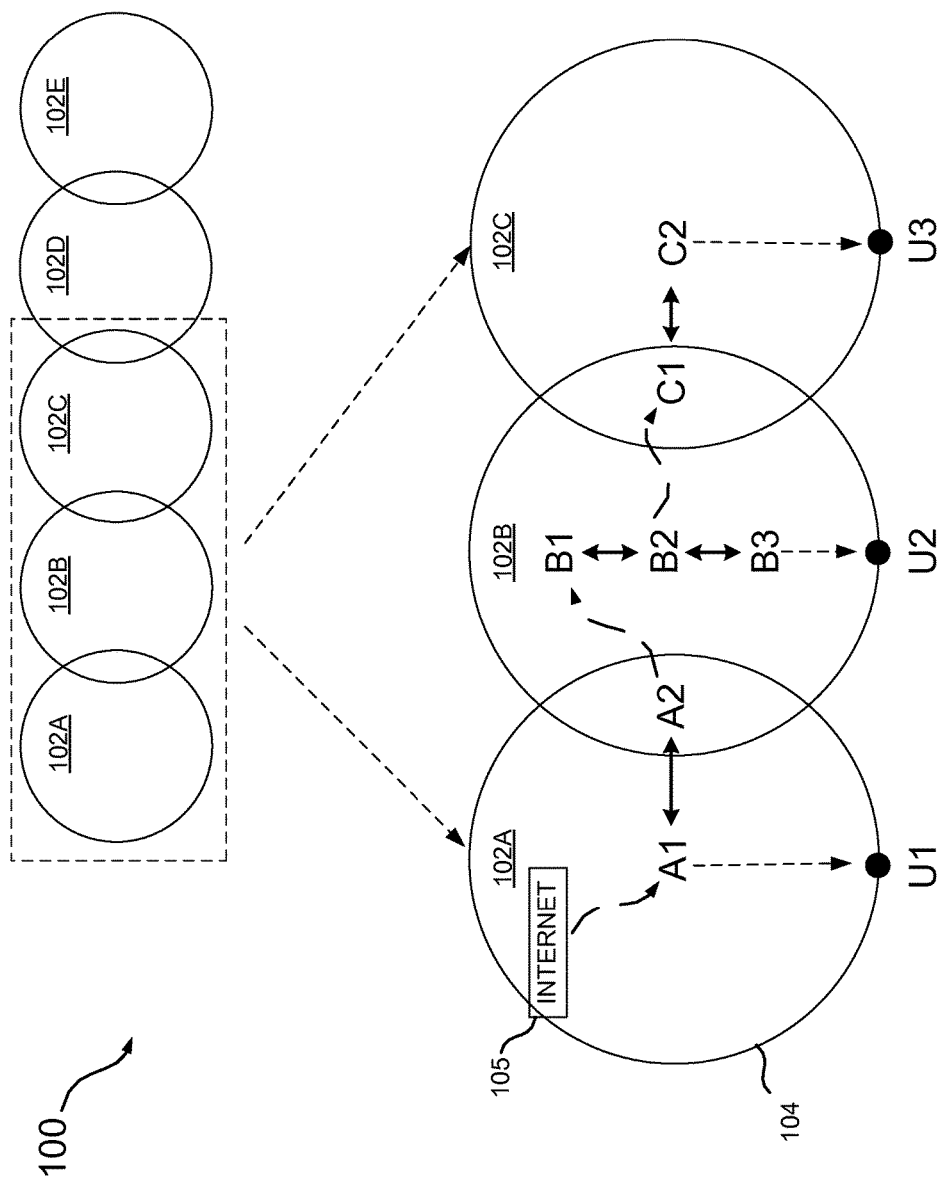
FIG. 1 illustrates one embodiment of a system for wirelessly extending range of a wireless network linearly from one access point to another.

Referring to FIG. 1, one embodiment of a wireless networking system is shown, generally designated 100, that increases the range of wireless network access. The wireless networking system 100 includes multiple wireless access points, or nodes, 102A-102E. The nodes may be positioned linearly, such as in serial or wirelessly daisy-chained arrangement, to linearly extend wireless network access across multiple access point coverage zones. A similar embodiment that extends coverage radially is described below with reference to FIGS. 4A-4C.

With continued reference to FIG. 1, for one specific embodiment, node 102A includes multiple radios A1 and A2. Radio A1 is configured as a receiver/transmitter (transceiver) that exhibits a wireless transceiver range, denoted by the circle at 104, to receive and transmit signals to a network, such as the Internet 105. Note that for purposes of clarity, each node is shown in FIG. 1 as having a range defined by the range of one of the radios. Radio A1, while acting as a receiver/transmitter (often referred to herein as a transceiver) is also able to broadcast and receive signals within its coverage area to users that are in the area 104, thereby serving as a wireless access point for that area. User U1 thus may access the Internet via radio A1. Radio A1 also communicates with a relay radio A2, which may be disposed near the periphery of the range 104 of radio A1. Relay radio A2 has a similar range as radio A1, and is able to communicate with radio B1 that is associated with node 102B. For some embodiments, the relay radio (such as radio A2) for a given node is assigned to one or more dedicated transceivers (such as B1) associated with respective adjacent nodes. Additionally, in general, the transceivers of a given node can communicate to any of the transceivers available in adjacent nodes.

Further referring to FIG. 1, node 102B includes three radios, one to establish communication with radio A2 of node 102A, a second radio B2 to act as a relay to a third node 102C, and a third radio B3 to act as a wireless access point to a second user U2 within the node 102B. The third node 102C includes a first radio C1 to communicate with the second radio B2 of the second node 102B, and a second radio C2 to provide wireless access to a third user U3 within the access coverage area of the third node 102C. Thus, with communication links established from the Internet to radio A1, to radio A2, to radio B1 to radio B2 to radio C1 and to radio C2, the user U3 is able to access the Internet wirelessly even though the distance between the user U3 to the first wireless access point A1 exceeds the coverage or range of radio A1.

Each node 102A-102C described above, may be configured differently depending on the available resources and bandwidth demands. Thus, a given radio may handle multiple tasks to receive and broadcast simultaneously, if the bandwidth demands are relatively low, or handle a single task, such as relay radio A2, if the bandwidth demand necessitates the need for additional wireless transceiver resources.

Figure 2:
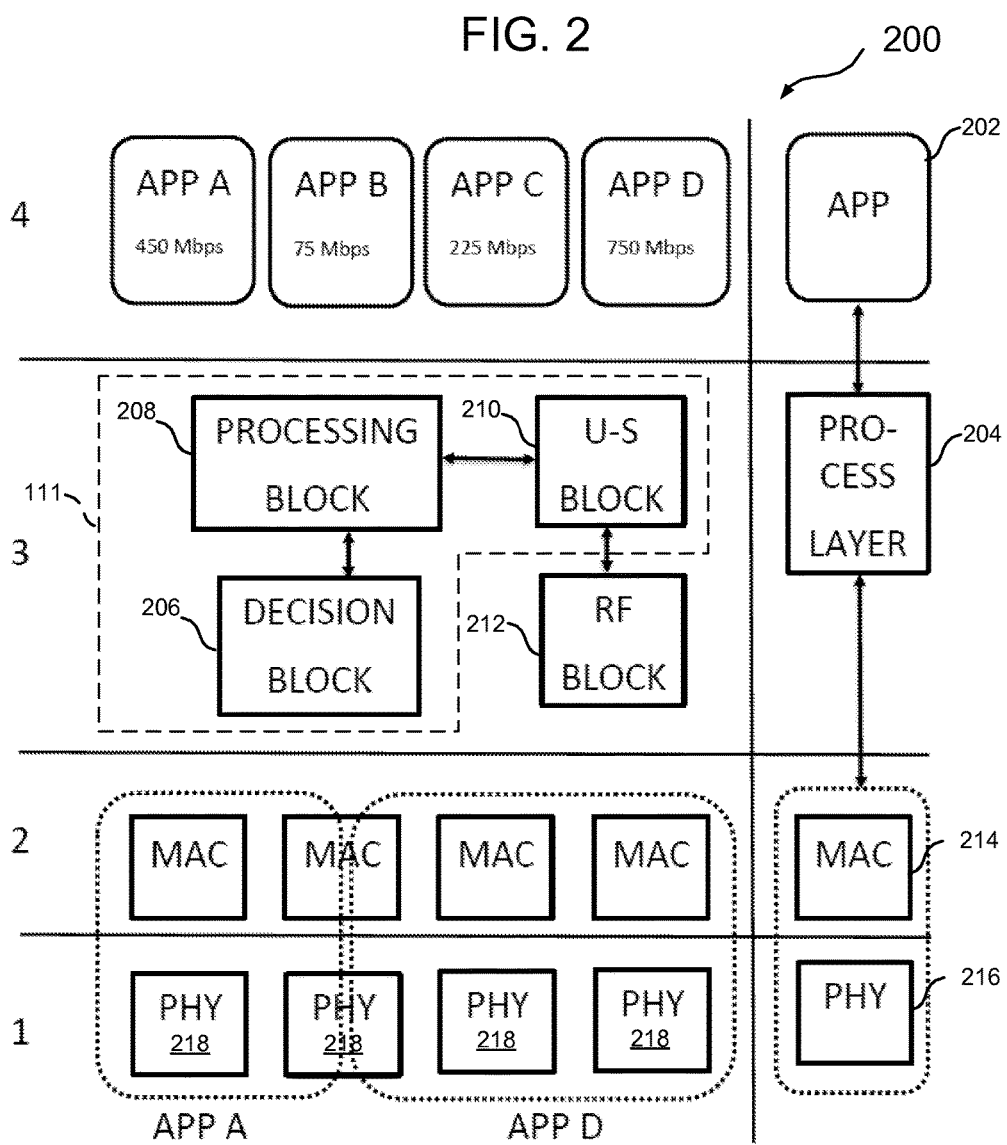
FIG. 2 illustrates a wireless management system that utilizes a virtual MAC and virtual PHY to wirelessly and adaptively manage and control multiple radios in a given wireless access point.

To manage the allocation and configuration of wireless transceiver resources, each node employs a management system, such as one embodiment shown in FIG. 2, and generally designated 200. The management systems for multiple nodes thus forms distributed logic that cooperate to efficiently manage bandwidth utilization for users. Further details of the management system for a variety of applications are disclosed in copending U.S. patent application Ser. No. 14/526,792, titled METHOD AND APPARATUS FOR PROCESSING BANDWIDTH INTENSIVE DATA STREAMS USING VIRTUAL MEDIA ACCESS CONTROL AND PHYSICAL LAYERS, filed Oct. 29, 2014, and expressly incorporated herein by reference.

Further referring to FIG. 2, one specific embodiment of the management system 200, is shown in a networking "layer" context. Generally speaking, the wireless management system may be configured for coupling an available transceiver resource to a WiFi network, a mobile wireless network, or a combination of the two. The management system 200 includes an application layer "APP", at 202, with one or more data-intensive software applications "APP A"-"APP D." The individual applications, for example, may have different peak bandwidth requirements in terms of data transfer rates. Thus, for instance, application APP A may have a peak bandwidth requirement of 450 Megabits per second (Mbps), while application APP D may have a peak bandwidth requirement of 750 Mbps.

Further referring to FIG. 2, the application layer 202 cooperates with a process layer, at 204. The process layer includes a decision block 206 that interfaces with a processing block 208. The decision block determines the size and type of data stream being received, and the type of processing necessary to put the stream in a format where it is capable of being transmitted. The processing block processes the data stream as determined by the decision block, and couples to an ultra-streaming block 210. The ultra-streaming block manages the processing of signal streams or sub-streams given the available resources (memory, processing speed, number of available radios, etc.), and packetizes sufficiently processed streams or sub-streams. The ultra-streaming block feeds data to and from an RF block 212. While not explicitly shown in FIG. 2, the ultra-streaming block carries out a monitoring function, more fully described below, that feeds back wireless resource availability to the decision block 206. Various ways for determining availability of resources include common memory, host interfaces, common threads, and/or queues or other data structures.

The decision block 206, processing block 208 and ultra-streaming block 210 together form a virtual MAC layer 211. The RF block 212 forms a virtual PHY layer. The virtual MAC and PHY layers enable simultaneous allocation of multiple PHY resources for different signal types associated with different applications. Transceiver configurations may be applied at initialization of the system, periodically during normal operation, or randomly on demand during operation. As a result, the most efficient path for wireless access between a given user and the wireless network is paved. The wireless networking system 200 thus exhibits significant performance improvements and efficiency advantages.

With continued reference to FIG. 2, the wireless management system 200 includes an actual media access control (MAC) layer, at 214, and an actual physical (PHY) layer, at 216. The actual MAC layer 214 generally includes software resources capable of controlling one or more transceiver resources 218 that are at the actual PHY layer, such as various radios and receivers. The actual PHY layer 216 may include multiple transceiver resources corresponding to multiple radios, each with an actual data transfer capability, or bandwidth.

The actual PHY layer transceivers may transmit and receive data consistent with a variety of signal protocols, such as High Definition Multimedia Interface (HDMI) consistent with the IEEE 802.11 Standard, Multiple-In Multiple-Out (MIMO), standard Wi-Fi physical control layer (PHY) and Media Access Control (MAC) layer, and existing IP protocols. Additionally, extremely high bandwidth applications such as Voice Over IP (VOIP), streaming audio and video content, multicast applications, convergent and ad-hoc network environment may employ signal protocols consistent with the wireless network system described herein. Additionally, the wireless management system may be employed and/or embedded into a variety of electronic devices, including wireless access points, base stations, handhelds, tablets, computers, telephones, televisions, DVD players, BluRay players, media players, storage devices, or any such devices that use wireless networks to send and receive data including stand-alone add-on devices such as "dongles" that serve as wireless interfaces between devices.

Figure 3:
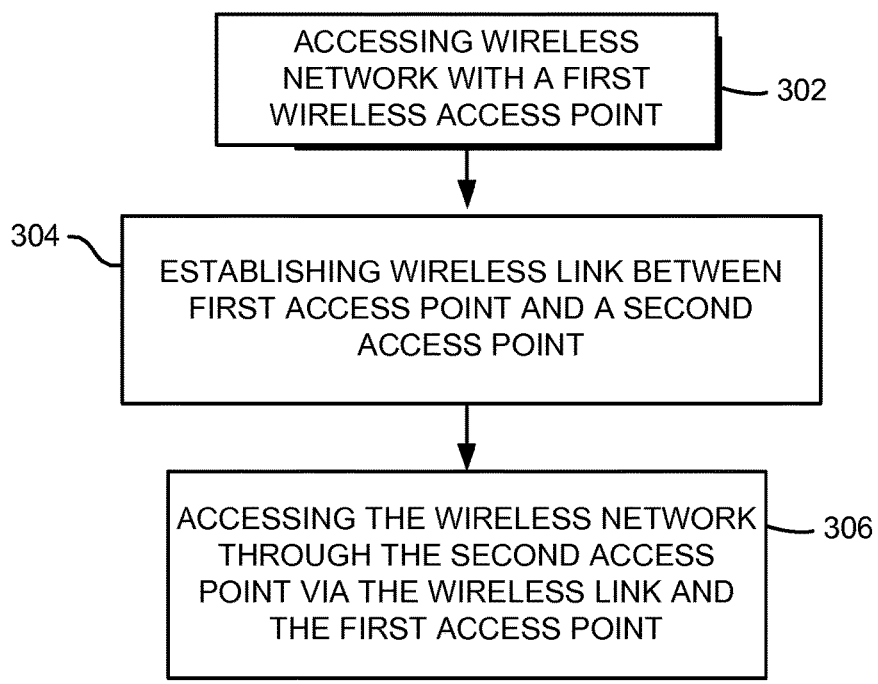
FIG. 3 illustrates a flowchart of steps for one embodiment of a method of wirelessly accessing a wireless network, consistent with the systems shown in FIGS. 1 and 2.

FIG. 3 illustrates a flowchart that shows generic steps carried out during operation of the wireless networking system of FIG. 1. At 302, the first node 102A (FIG. 1) accesses a wireless network, such as the Internet 105, with a first radio or transceiver A1. A second transceiver A2, establishes a wireless link with the first transceiver A1, at 304. The second transceiver may then act as a relay to establish a further link with a radio in a different node, such as radio B1 in node 102B. The wireless network may then be accessed through the different node 102B via the wireless link (between radios B1 and A2) and the first access point, at 306. By employing a plurality of transceivers at each of the nodes that run the UltraStreaming engine to allocate their available resources, either at initialization as configurable, or while in operation periodically, or dynamically in random demand while in operation, the most efficient path for wireless access is accomplished. This results in increased range and coverage for a given wireless network, and it's Internet access.

Figure 4A:
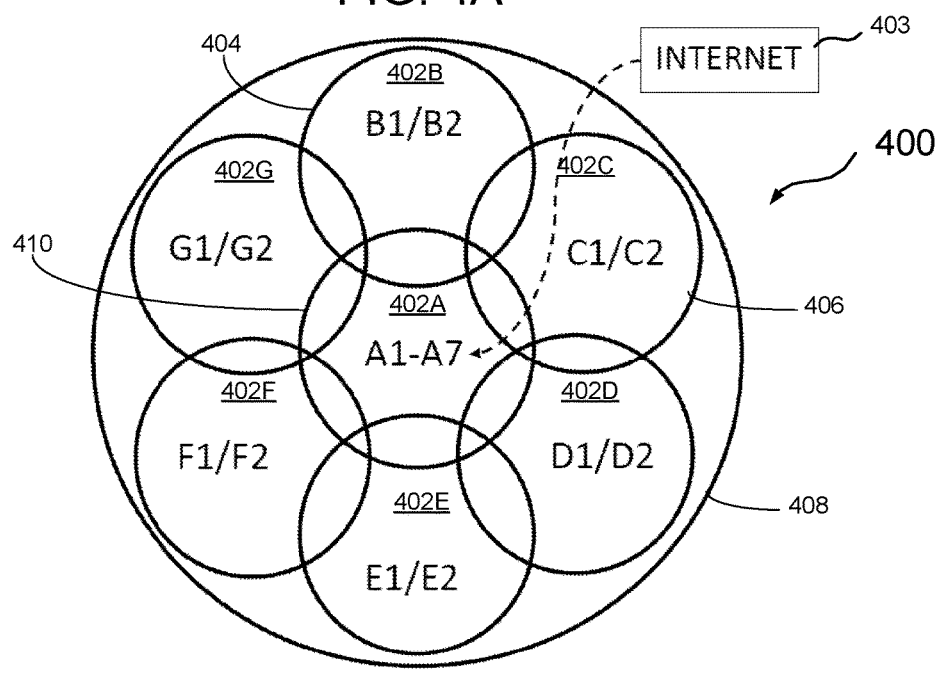
FIG. 4A-4C illustrate embodiments of a system for wirelessly extending range of a wireless network radially from one access point to other access points.
Figure 4B:
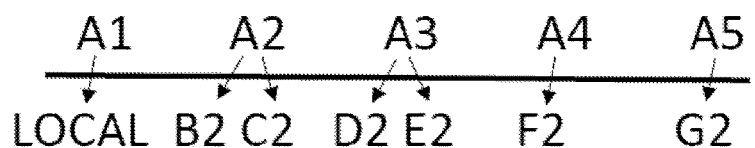
Figure 4C:
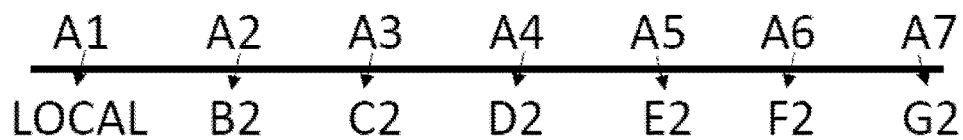

FIGS. 4A-4C illustrate a further embodiment of a wireless networking system, generally designated 400, that is similar to the system of FIG. 1, but configured with various nodes 402A-402G that are positioned in a relative manner to extend coverage radially, rather than linearly. Each of the nodes includes a wireless management system, such as that shown in FIG. 2 and described above.

Further referring to FIG. 4A, a first node 402A includes radios A1-A7, with radio A1 acting as an originating access point for a local network signal, such as the Internet 403. The remaining radios A2-A7 may then be configured to communicate with specified adjacent nodes. The adjacent nodes have respective coverage zones that overlap the primary node 402A radially outwardly. Thus, by encircling the primary node with the other nodes, the corresponding coverage area may be increased dramatically.

FIG. 4B illustrates one configuration where radio A1 acts as the originating radio to communicate with the local wireless network, and radio A2 communicates the network signal as a relay with radios B2 and C2, of nodes 402B and 402C. Radios B1 and C1 of each respective node broadcast wireless access to users within the respective coverage zones, bounded by coverage rings 404 and 406 associated with each respective node 402B and 402C. Similar arrangements are managed with radio A3 communicating with radios D2 and E2, and radios A4 and A5 communicating with F2 and G2, respectively. To optimize coverage radially, the nodes 402B-402G are positioned radially around the primary node 402A in a honeycomb structure. The resulting coverage boundary, represented by the coverage circle 408, is significantly larger than the originating access coverage area (represented by ring 410) provided by the broadcast radio associated with node 402A by itself.

FIG. 4C illustrates different assignments of the radios in the wireless networking system of FIG. 4A managed by the wireless management system 400 of each node 402A-402G. The assignments and radio configurations may be defined and managed during an initialization process, periodically during operation, or randomly on demand depending on the bandwidth demands of the system. Thus, if bandwidth demands are higher in nodes 402B and 402C, then instead of sharing the bandwidth of radio A2 with nodes 402B (radio B2) and 402C (radio C2), such as the arrangement of FIG. 4B, dedicated relay radios A2 and A3 may be assigned to each of those nodes so that maximum bandwidth may be provided to each, resulting in radio A2 communicating with radio B2 and radio A3 communicating with radio C2 (FIG. 4C).

Figure 5:
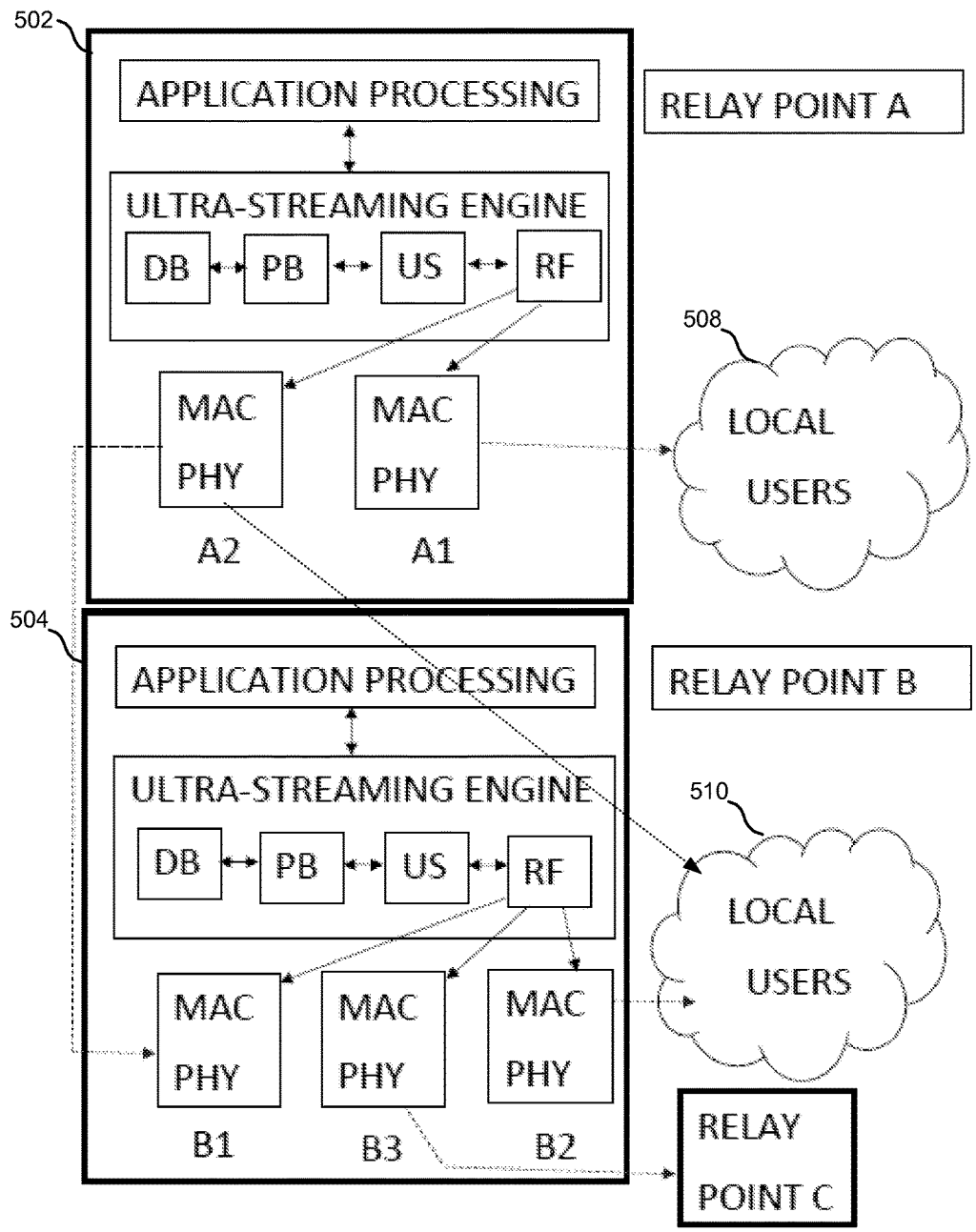
FIG. 5 illustrates one embodiment of multiple wireless management systems that cooperate to allocate transceiver resources between users.

For some embodiments, whether the wireless networking system is configured as a linear or radial architecture, there may be multiple transceivers assigned to a wireless node, and each node may have multiple transceivers assigned to a given user. FIG. 5 illustrates how multiple wireless management systems cooperate to efficiently allocate transceiver resources in such a situation. A first node management system 502 may control transceiver resources A1 and A2 within a first node. A second management system 504 may control transceiver resources B1, B2, and B3. The management systems 502 and 504 communicate with each other to determine the optimal resource allocation to service respective local users, at 508 and 510.

Thus, for the example shown in FIG. 5, the first local user 508 within the coverage of the first node may need bandwidth that may be sufficiently provided by transceiver A1 alone. The second local user 510, positioned within the vicinity of both the first and second nodes, may be assigned transceiver A2 from the first node, and transceiver B2 from the second node, thereby having access to twice the bandwidth. Other examples may involve partial transceiver allocations, where a portion of the transceiver bandwidth is allocated to a first user, and a second portion of the bandwidth allocated to a second user.

In some embodiments, a given wireless link may be configured as a variable duplex link. Each wireless management system may task the virtual MAC and virtual PHY to control respective transmit and receive cycles for one or more of the wireless transceivers. Varying the transmit and/or receive times may be accomplished in various ways, such as through programmable buffer resources and/or through programmable transmit and receive times. Further detail of such a variable duplex wireless link may be found in copending U.S. patent application Ser. No. 14/526,792, titled METHOD AND APPARATUS FOR PROCESSING BANDWIDTH INTENSIVE DATA STREAMS USING VIRTUAL MEDIA ACCESS CONTROL AND PHYSICAL LAYERS, filed Oct. 29, 2014, and expressly incorporated herein by reference.

Those skilled in the art will appreciate that the embodiments described above enable efficient wireless access to wireless networking systems by users that might be outside the range of a single wireless access point. By employing linear and/or radial wireless access system architectures, and configuring available wireless transceiver resources optimally within each node, a given wireless network may be accessed with greater bandwidth and more efficiently.

When received within a computer system via one or more computer-readable media, such data and/or instruction-based expressions of the above described circuits may be processed by a processing entity (e.g., one or more processors) within the computer system in conjunction with execution of one or more other computer programs including, without limitation, net-list generation programs, place and route programs and the like, to generate a representation or image of a physical manifestation of such circuits. Such representation or image may thereafter be used in device fabrication, for example, by enabling generation of one or more masks that are used to form various components of the circuits in a device fabrication process.

In the foregoing description and in the accompanying drawings, specific terminology and drawing symbols have been set forth to provide a thorough understanding of the present invention. In some instances, the terminology and symbols may imply specific details that are not required to practice the invention. For example, any of the specific numbers of bits, signal path widths, signaling or operating frequencies, component circuits or devices and the like may be different from those described above in alternative embodiments. Also, the interconnection between circuit elements or circuit blocks shown or described as multi-conductor signal links may alternatively be single-conductor signal links, and single conductor signal links may alternatively be multi-conductor signal links. Signals and signaling paths shown or described as being single-ended may also be differential, and vice-versa. Similarly, signals described or depicted as having active-high or active-low logic levels may have opposite logic levels in alternative embodiments. Component circuitry within integrated circuit devices may be implemented using metal oxide semiconductor (MOS) technology, bipolar technology or any other technology in which logical and analog circuits may be implemented. With respect to terminology, a signal is said to be "asserted" when the signal is driven to a low or high logic state (or charged to a high logic state or discharged to a low logic state) to indicate a particular condition. Conversely, a signal is said to be "deasserted" to indicate that the signal is driven (or charged or discharged) to a state other than the asserted state (including a high or low logic state, or the floating state that may occur when the signal driving circuit is transitioned to a high impedance condition, such as an open drain or open collector condition). A signal driving circuit is said to "output" a signal to a signal receiving circuit when the signal driving circuit asserts (or deasserts, if explicitly stated or indicated by context) the signal on a signal line coupled between the signal driving and signal receiving circuits. A signal line is said to be "activated" when a signal is asserted on the signal line, and "deactivated" when the signal is deasserted. Additionally, the prefix symbol "/" attached to signal names indicates that the signal is an active low signal (i.e., the asserted state is a logic low state). A line over a signal name (e.g., '<signalname>') is also used to indicate an active low signal. The term "coupled" is used herein to express a direct connection as well as a connection through one or more intervening circuits or structures. Integrated circuit device "programming" may include, for example and without limitation, loading a control value into a register or other storage circuit within the device in response to a host instruction and thus controlling an operational aspect of the device, establishing a device configuration or controlling an operational aspect of the device through a one-time programming operation (e.g., blowing fuses within a configuration circuit during device production, and/or connecting one or more selected pins or other contact structures of the device to reference voltage lines (also referred to as strapping) to establish a particular device configuration or operation aspect of the device. The term "exemplary" is used to express an example, not a preference or requirement.

While the invention has been described with reference to specific embodiments thereof, it will be evident that various modifications and changes may be made thereto without departing from the broader spirit and scope of the invention. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

I claim:

1. A WiFi wireless local area networking system comprising:
   a WiFi wireless access point having a first coverage area, the WiFi wireless access point including a first set of wireless transceivers including a first wireless transceiver to directly access a wireless network and a second wireless transceiver coupled to the first wireless transceiver, the first WiFi wireless access point including first processing logic to control the first set of wireless transceivers;
   a second WiFi wireless access point having a second coverage area, the second WiFi wireless access point including a second set of wireless transceivers including a third wireless transceiver for establishing a wireless link with the second wireless transceiver, and a first group of at least two access transceivers coupled to the third wireless transceiver to provide a first user access to the wireless link, the second WiFi wireless access point including second processing logic to control the third wireless transceiver and the first group of at least two access transceivers, wherein the at least two access transceivers each provide a given bandwidth and are aggregated by the second processing logic to define a single virtual link with an available bandwidth greater than the given bandwidth;
   wherein the first user in the second coverage area indirectly accesses the first wireless network associated with the first WiFi wireless access point via the wireless link and the second and first wireless transceivers;
   wherein the first and second processing logic cooperate to define distributed logic and, for each WiFi wireless access point, to configure actual wireless transceiver resources via respective virtual MAC and virtual PHY layers disposed between an application layer and actual MAC and PHY layers.

2. The WiFi wireless local area networking system according to claim 1, wherein the configuring is carried out in response to data provided back via a feedback loop.

3. The WiFi wireless local area networking system according to claim 1, further including a third WiFi wireless access point having a third coverage area, the third WiFi wireless access point having a fourth wireless transceiver for establishing a second wireless link with at least one transceiver from the first or second set of wireless transceivers, and a second group of at least two wireless transceivers for providing user access to the wireless network via the second wireless link.

4. The WiFi wireless local area networking system according to claim 3, wherein the first, second and third WiFi wireless access points are linearly coupled to extend wireless access to the wireless network from the first WiFi wireless access point to the third WiFi wireless access point.

5. The WiFi wireless local area networking system according to claim 4, wherein the first coverage area does not overlap the third coverage area.

6. The WiFi wireless local area networking system according to claim 3, wherein the second and third WiFi wireless access points are radially coupled to the first WiFi wireless access point to extend wireless access coverage to the wireless network within the first WiFi wireless access point, the second WiFi wireless access point, and the third WiFi wireless access point.

7. The WiFi wireless local area networking system according to claim 6, wherein at least a portion of the first coverage area overlaps the third coverage area.

8. The WiFi wireless local area networking system according to claim 6, wherein the second and third WiFi wireless access points lie in an arc radially disposed around the first WiFi wireless access point.

9. The WiFi wireless local area networking system according to claim 1, wherein a second user is within the first and second coverage areas, and accesses the wireless network wirelessly through at least one transceiver resource associated with the first WiFi wireless access point and at least one transceiver resource associated with the second WiFi wireless access point.

10. A method of providing WiFi wireless local area network access to a user, the method comprising:
    accessing a wireless network with a first wireless transceiver associated with a first WiFi wireless access point, the first WiFi wireless access point including a first set of wireless transceivers, having a first coverage area bounded by a range of a first broadcast transceiver associated with the first WiFi wireless access point;
    enabling direct wireless access to the wireless network within the first coverage area with the first broadcast transceiver;
    establishing a wireless link between the first WiFi wireless access point and a third wireless transceiver associated with a second WiFi wireless access point including a second set of wireless transceivers, the second WiFi wireless access point having a second coverage area bounded by a fourth wireless transceiver, the fourth wireless transceiver in communication with the third wireless transceiver, and a first group of at least two access transceivers coupled to the third wireless transceiver;

configuring actual wireless transceiver resources via respective virtual MAC and virtual PHY layers disposed between an application layer and actual MAC and PHY layers, the configuring carried out through distributed logic associated with the first WiFi wireless access point and the second WiFi wireless access point;

wherein for each WiFi wireless access point, the access point includes the first group of at least two access transceivers, wherein the at least two access transceivers each provide a given bandwidth and are aggregated to define a single virtual link with an available bandwidth greater than the given bandwidth; and enabling indirect access to the wireless network for a first user within the second coverage area via the fourth wireless transceiver.

11. The method of claim 10, further comprising:

enabling access to the wireless network via a fifth wireless transceiver associated with a third WiFi wireless access point.

12. The method of claim 11, wherein the enabling access to the wireless network via the fifth wireless transceiver comprises:

serially coupling the third WiFi wireless access point to the second WiFi wireless access point to establish a second wireless link between the fifth wireless transceiver and the fourth wireless transceiver.

13. The method of claim 11, wherein the enabling access to the wireless network via the fifth wireless transceiver comprises:

radially coupling the third WiFi wireless access point to the first WiFi wireless access point to establish a second wireless link between the fifth wireless transceiver and the second wireless transceiver.

14. The method of claim 10, further comprising allocating wireless link assignments between the first, second, third and fourth transceivers with a wireless management system.

15. The method of claim 14, wherein the allocating is performed during at least one of an initialization process, periodically during normal operation, or randomly on demand.

16. A WiFi wireless access point for use in a wireless networking system, the WiFi wireless access point comprising:

a first wireless transceiver associated with a first WiFi wireless access point, the first WiFi wireless access point including a first set of wireless transceivers, to establish a WiFi wireless link to a wireless local area network;

a second wireless transceiver to provide wireless access to the wireless link within a first coverage area;

a third wireless transceiver, and a first group of at least two access transceivers coupled to the third wireless transceiver, to establish a wireless link to a second WiFi wireless access point including a second set of wireless transceivers;

distributed processing logic to control each of the first, second and third wireless transceivers;

wherein the distributed processing logic configures actual radio resources via respective virtual MAC and virtual PHY layers disposed between an application layer and actual MAC and PHY layers; and wherein for each WiFi wireless access point, the access point includes the first group of at least two access transceivers, wherein the at least two access transceivers each provide a given bandwidth and are aggregated to define a single virtual link with an available bandwidth greater than the given bandwidth.

17. The WiFi wireless access point of claim 16, wherein the configuring is carried out during at least one of an initialization process, periodically during normal operation, or randomly on demand.

* * * * *